(12) United States Patent
Bailey et al.

(10) Patent No.: US 7,779,903 B2
(45) Date of Patent: Aug. 24, 2010

(54) SOLID RUBBER PACKER FOR A ROTATING CONTROL DEVICE

(75) Inventors: Thomas F. Bailey, Houston, TX (US); James W. Chambers, Hackett, AR (US); Mark F. Gravouia, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 221 days.

(21) Appl. No.: 11/123,329

(22) Filed: May 6, 2005

(65) Prior Publication Data
US 2005/0241833 A1    Nov. 3, 2005

Related U.S. Application Data

(63) Continuation-in-part of application No. 10/285,336, filed on Oct. 31, 2002, now Pat. No. 7,040,394.

(51) Int. Cl.
*E21B 19/00* (2006.01)
(52) U.S. Cl. .................... 166/84.4; 277/333
(58) Field of Classification Search ............. 166/84.1, 166/84.2, 84.3, 84.4; 175/195; 277/333
See application file for complete search history.

(56) References Cited

U.S. PATENT DOCUMENTS

| | | | |
|---|---|---|---|
| 3,583,480 A | 6/1971 | Regan | |
| 3,614,111 A | 10/1971 | Regan | |
| 4,143,881 A | 3/1979 | Bunting | |
| 4,313,054 A | 1/1982 | Martini | |
| 4,440,232 A | 4/1984 | LeMoine | |
| 4,448,255 A | 5/1984 | Shaffer et al. | |
| 4,509,405 A | 4/1985 | Bates | |
| 4,531,580 A | 7/1985 | Jones | |
| 5,178,215 A | 1/1993 | Yenulis et al. | |
| 5,251,869 A | 10/1993 | Mason | |
| 5,348,107 A | 9/1994 | Bailey et al. | |
| 5,662,181 A | 9/1997 | Williams et al. | |
| 5,848,643 A | 12/1998 | Carbaugh et al. | |
| 6,109,348 A | 8/2000 | Caraway | |
| 6,129,152 A | 10/2000 | Hosie et al. | |
| 6,138,774 A | 10/2000 | Bourgoyne, Jr. et al. | |

(Continued)

FOREIGN PATENT DOCUMENTS

EP        0306127        6/1988

(Continued)

OTHER PUBLICATIONS

GB Search Report, Application No. 0608870.2, Dated Aug. 31, 2006.

(Continued)

*Primary Examiner*—Daniel P Stephenson
(74) *Attorney, Agent, or Firm*—Patterson & Sheridan, LLP

(57) ABSTRACT

A seal assembly for use with a rotating control head is provided. The seal assembly includes a rotatable member and a cavity formed between the rotatable member and a tubular radially inwardly disposed from the rotatable member. The cavity having a first surface and a second surface. The seal assembly further includes a seal member having a first end and a second end disposed between the first surface and the second surface of the cavity and sealable with the tubular between the first and the second ends due to deformation of the seal member.

42 Claims, 5 Drawing Sheets

U.S. PATENT DOCUMENTS

| | | |
|---|---|---|
| 6,244,359 B1 | 6/2001 | Bridges et al. |
| 6,263,982 B1 | 7/2001 | Hannegan et al. |
| 6,354,385 B1 | 3/2002 | Ford et al. |
| 6,470,975 B1 | 10/2002 | Bourgoyne et al. |
| 6,547,002 B1 | 4/2003 | Bailey et al. |
| 6,554,016 B2 | 4/2003 | Kinder |
| 6,702,012 B2 | 3/2004 | Bailey et al. |
| 6,913,092 B2 | 7/2005 | Bourgoyne et al. |
| 7,004,444 B2 | 2/2006 | Kinder |
| 7,040,394 B2 | 5/2006 | Bailey et al. |
| 7,080,685 B2 | 7/2006 | Bailey et al. |
| 7,159,669 B2 | 1/2007 | Bourgoyne et al. |
| 7,165,610 B2 | 1/2007 | Hopper |
| 2002/0070014 A1 | 6/2002 | Kinder |
| 2002/0070503 A1 | 6/2002 | Zimmerman et al. |
| 2003/0080515 A1 | 5/2003 | Milberger et al. |
| 2003/0094276 A1 | 5/2003 | Smith, Jr. |
| 2003/0102136 A1 | 6/2003 | Nelson et al. |
| 2005/0000698 A1 | 1/2005 | Bailey et al. |
| 2005/0161232 A1 | 7/2005 | Patel et al. |
| 2005/0241833 A1 | 11/2005 | Bailey et al. |

FOREIGN PATENT DOCUMENTS

| | | |
|---|---|---|
| EP | 1 627 986 | 8/2005 |
| GB | 2216965 | 10/1989 |
| GB | 2 357 098 | 6/2001 |
| GB | 2 394 741 | 5/2004 |
| WO | WO 01/92682 | 12/2001 |
| WO | WO 2005/022012 | 3/2005 |

OTHER PUBLICATIONS

GB Search Reports, Application No. GB0608870.2, dated Aug. 1, 2007.

SOLID RUBBER PACKER FOR A ROTATING CONTROL DEVICE

CROSS-REFERENCE TO RELATED APPLICATIONS

This application is a continuation-in-part of U.S. patent application Ser. No. 10/285,336, filed on Oct. 31, 2002, now U.S. Pat No. 7,040,394 which is herein incorporated by reference.

BACKGROUND OF THE INVENTION

1. Field of the Invention

Embodiments of the present invention generally relate to wellbore operation. More particularly, the invention relates to a method of use and an apparatus for sealing around a tubular. Still more particularly, the invention relates to a seal assembly for use in a control head.

2. Description of the Related Art

Drilling a wellbore for hydrocarbons requires significant expenditures of manpower and equipment. Thus, constant advances are being sought to reduce any downtime of equipment and expedite any repairs that become necessary. Rotating equipment is particularly prone to maintenance as the drilling environment produces abrasive cuttings detrimental to the longevity of rotating seals, bearings, and packing elements.

In a typical drilling operation, a drill bit is attached to a string of drill pipe. Thereafter, a drive unit rotates the string of drill pipe through a drive member, referred to as a kelly as the string of drill pipe and drill bit are urged downward to form the wellbore. In some arrangements, a kelly is not used, thereby allowing the drive unit to attach directly to the drill pipe. The length of the wellbore is determined by the location of the hydrocarbon formations. In many instances, the formations produce gas or fluid pressure that may be a hazard to the drilling crew and equipment unless properly controlled.

Several components are used to control the gas or fluid pressure. Typically, one or more blow out preventers (BOP) are mounted to the well forming a BOP stack to seal the mouth of the well. Additionally, an annular BOP is used to selectively seal the lower portions of the well from a tubular body that allows the discharge of mud through the outflow line.

An example of a BOP is disclosed in U.S. Pat. No. 4,440,232. The BOP in '232 uses a spherical sealing element to seal the mouth of the well. The spherical sealing element is typically made from an elastomeric material and formed in a shape of a dome with a hole in the middle thereof wherein the inner diameter of the spherical sealing element is greater than an outer diameter of a tubular and greater than an outer diameter of a tubular joint. An upper end of the spherical sealing element is reinforced by a plurality of flanged steel inserts and a lower end of the spherical sealing element is supported by a movable tapered piston. In operation, fluid pressure wedges the tapered piston against the spherical sealing element, thus urging the spherical sealing element against the plurality of flanged steel inserts and causes the spherical sealing element to move radially outward into contact with the tubular to form a seal between the BOP and the tubular. Even though an effective seal is formed between the BOP and the tubular, the spherical element may be damaged as the tubular is rotated and tubular joints are stripped through a closed BOP. More specifically, as the spherical sealing element is urged against the plurality of flanged inserts, the sealing element tends to extrude under the noses of the flanged inserts where it is restricted from movement and forced into the path of the moving tool joint which results in damage to the spherical sealing element.

In many instances, a conventional rotating control head, also referred to as a rotating blow out preventor, is mounted above the BOP stack. An internal portion of the conventional rotating control head is designed to seal and rotate with the string of drill pipe. The internal portion typically includes an internal sealing element mounted on a plurality of bearings. The internal sealing element may consist of both a passive seal arrangement and an active seal arrangement. The active seal arrangement is hydraulically activated. Generally, a hydraulic circuit provides hydraulic fluid to the rotating control head. The hydraulic circuit typically includes a reservoir containing a supply of hydraulic fluid and a pump to communicate the hydraulic fluid from the reservoir to the rotating control head. As the hydraulic fluid enters the rotating control head, a pressure is created to energize the active seal arrangement. During the drilling operation, the string of drill pipe is axially and slidably forced through the rotating control head. The string of drill pipe is made up of individual drill pipes connected together at tool joints. The tool joints have a larger diameter than each individual drill pipe. In order to seal the mouth of the well, the active seal arrangement in the rotating control head must effectively maintain a seal around each drill pipe and the larger diameter joints between each drill pipe. However, the active seal arrangement in the conventional rotating control head has a tendency to leak at the seal as the string of drill pipe is axially forced through the rotating control head which may result in eventual failure of the rotating control head.

Additionally, as the string of drill pipe is axially and slidably forced through the rotating control head, the axial movement of the drill pipe causes wear and tear on the bearing and seal assembly and subsequently requires repair. Typically, the drill pipe or a portion thereof is pulled from the well and a crew goes below the drilling platform to manually release the bearing and seal assembly in the rotating control head. Thereafter, an air tugger in combination with a tool joint on the drill string is used to lift the bearing and seal assembly from the rotating control head. The bearing and seal assembly is replaced or reworked and thereafter the crew goes below the drilling platform to reattach the bearing and seal assembly into the rotating control head and operation is resumed. The process is time consuming and can be dangerous.

A need therefore exists for an improved active seal arrangement for a rotating control head. There is a further need for an active seal arrangement that can be efficiently removed from the rotating control for repair or replacement.

SUMMARY OF THE INVENTION

The present invention generally relates to an apparatus and method for sealing a tubular string. In one aspect, a seal assembly for use with a rotating control head is provided. The seal assembly includes a rotatable member and a cavity formed between the rotatable member and a tubular radially inwardly disposed from the rotatable member. The cavity having a first surface and a second surface. The seal assembly further includes a seal member having a first end and a second end disposed between the first surface and second surface of the cavity and sealable with the tubular between the first and the second ends due to deformation of the seal member.

In a further aspect, a method for sealing an annular space defined by a wellbore tubular and a seal housing is provided. The method includes providing a seal within a variable volume cavity, wherein the cavity is contained within the seal housing. The method further includes providing a wellbore tubular extending through the seal housing and presenting a variable diameter outer surface for engaging the seal. Additionally, the method includes automatically varying the volume of the cavity in response to a variation in diameter of the outer surface.

In yet a further aspect, a method for sealing a tubular in a control head is provided. The method includes providing a seal member contained within a substantially cylindrical volume and causing the seal member to deform radially by applying a compressive force to an end of the seal assembly from an end of the volume. Additionally, the method includes balancing the compressive force with a radial reforming force to allow an object applying the reforming force to pass axially through the seal member.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
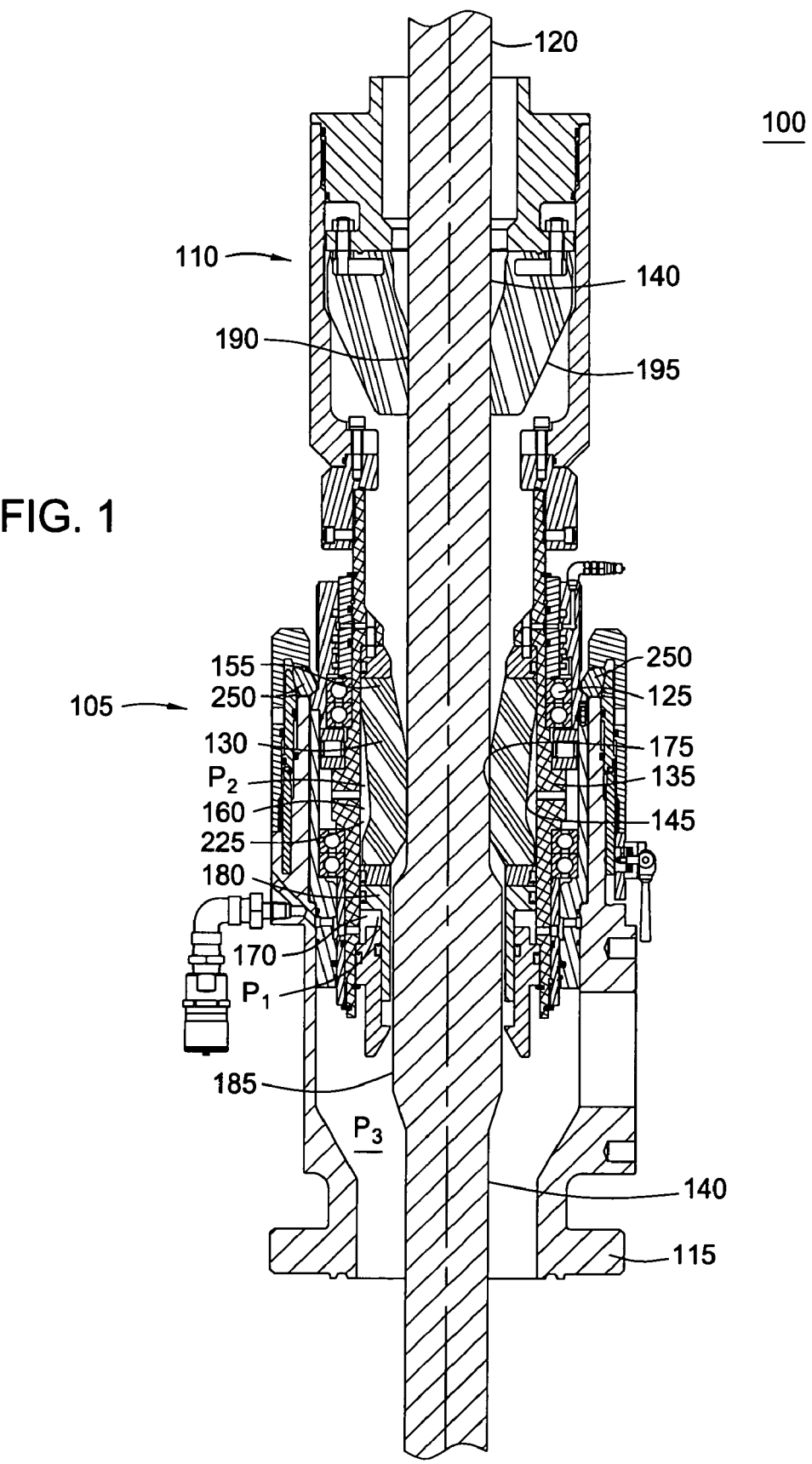
FIG. 1 is a cross-sectional view illustrating the rotating control head in accordance with the present invention.

The present invention generally relates to a rotating control head for use with a drilling rig. Typically, an internal portion of the rotating control head is designed to seal around a rotating tubular string and rotate with the tubular string by use of an internal sealing element, and rotating bearings. Additionally, the internal portion of the rotating control head permits the tubular string to move axially and slidably through the rotating control head. FIGS. 1 and 9 generally describe the rotating control head and FIGS. 2-8 describe several embodiments of a sealing assembly. To better understand the novelty of the present invention and the methods of use thereof, reference is hereafter made to the accompanying drawings.

FIG. 1 is a cross-sectional view illustrating the rotating control head 100 in accordance with the present invention. The rotating control head 100 includes an active seal assembly 105 and a passive seal assembly 110. Each seal assembly 105, 110 includes components that rotate with respect to a housing 115. The components that rotate in the rotating control head 100 are mounted for rotation on a rotatable member such as a plurality of bearings 125.

As depicted, the active seal assembly 105 includes a support housing 135 mounted on the plurality of bearings 125. The active seal assembly 105 includes an annular cavity 160 also referred to as a substantially cylindrical volume for housing a seal member 130. The cavity 160 is formed between a tubular 120 and a backing surface 145 of the support housing 135. The cavity 160 is a variable volume cavity. More specifically, the cavity 160 includes a fixed end 155 and a movable wall portion in the form of a piston 180 at another end thereof. The piston 180 is movable within a chamber 170 and thereby permits the volume and the shape of the cavity 160 to change due to a change in the shape of the seal member 130. The chamber 170 may include a pressure P1. Additionally, as illustrated in FIG. 1, a chamber 225 is formed between the housing 135 and the seal 130. The chamber 225 may include a pressure P2. In one embodiment, the piston 180 is a compliant piston which means that the piston is movable to conform or to adapt to the change of shape of the cavity 160 due to a change in the shape of the seal member 130.

The seal member 130 is typically made from a solid flexible material, such as an elastomer. As will be described herein, the application of a force on the seal member 130 causes the mid section of the seal member 130 at an inner surface 175 to contact and create a seal between the rotating control head 100 and the tubular 120. The tubular 120 has a variable diameter outer surface. For instance, the tubular 120 includes a smaller diameter outer surface 140 and a larger diameter outer surface 185. As shown in FIG. 1, the smaller diameter outer surface 140 is the outer surface of a single tubular and the larger diameter outer surface 185 is typically formed at a joint between two tubulars in the tubular string 120. In one embodiment, the seal member 130 is arranged such that an inner diameter of the seal member 130 is slightly larger than the outer diameter surface 140 of the tubular 120 yet smaller than an outer diameter surface 185 of the tubular 120 to allow an interference fit therebetween. Furthermore, a wellbore pressure P3 below the active seal assembly 105 may be utilized to assist the piston 180 in the formation of a seal between the seal member 130 and the tubular 120.

In the embodiment shown in FIG. 1, the passive seal assembly 110 is disposed above the active seal assembly 105. It should be understood, however, that the passive seal assembly 110 may be positioned below the active seal assembly without departing from principles of the present invention. The passive seal assembly 110 is operatively attached to the support housing 135, thereby allowing the passive seal assembly 110 to rotate with the active seal assembly 105. Fluid is not required to operate the passive seal assembly 110, but rather the assembly 110 utilizes the wellbore pressure P3 to create a seal around the tubular 120. The passive seal assembly 110 is constructed and arranged in an axially downward conical shape, thereby allowing the wellbore pressure P3 to act against a tapered surface 195 to close the passive seal assembly 110 around the tubular. Additionally, the passive seal assembly 110 includes an inner diameter 190 smaller than the outer diameter of the tubular to allow an interference fit between the tubular 120 and the passive seal assembly 110.

The rotating control head 100 also includes a releasable member 250 for connecting the active seal assembly 105 to the housing 115. If a component of the active seal assembly 105 requires repair or replacement, then the releasable member 250 is activated which allows the active seal assembly 105 to be released easily from the housing 115. Due to the size of the active seal assembly 105, the seal assembly 105 typically may be removed without having to use a crane to lift the rotating control head 100 and without disassembling portions of the drilling platform. After the component in the active seal assembly 105 is replaced or repaired, then the active seal assembly 105 may be once again easily attached to the housing 115 and secured into place by the releasable member 250. An example of a high pressure rotating drilling head assembly with a hydraulically removable packer is disclosed in U.S. Pat. No. 6,547,002 and U.S. Pat. No. 6,702,012, both of which are incorporated herein in their entirety.

Figure 2:
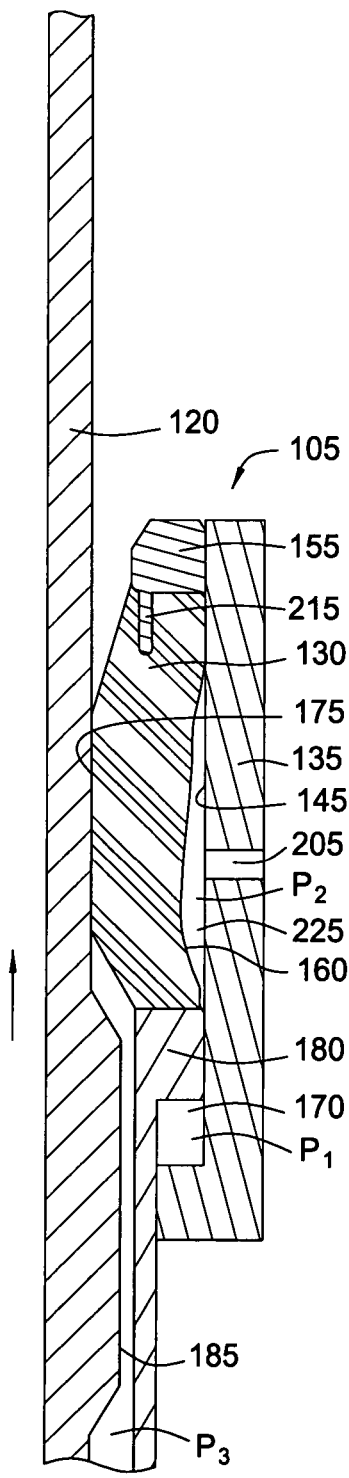
FIG. 2 is an enlarged sectional view of one embodiment of the active seal assembly.

FIG. 2 is an enlarged sectional view of one embodiment of the active seal assembly 105. As shown, the seal 130 has been urged radially inward into contact with the tubular 120, thereby forming a sealing relationship between the tubular 120 and the rotating control head 100. In this embodiment, the sealing relationship is formed by urging fluid through a port 205 into the chamber 225 formed between the housing 135 and the seal 130. As fluid builds up in the chamber 225, the fluid pressure P2 urges the seal 130 toward the tubular 120 to form the sealing relationship therebetween. Thereafter, a hydraulic control (not shown) maintains and monitors the fluid pressure P2 in the chamber 225. In this embodiment, the fluid pressure P2 is preferably maintained between 0 to 200 psi above the wellbore pressure P3 and the piston pressure P1 is maintained at atmospheric pressure. Additionally, as shown in FIG. 2, the end 155 of the cavity 160 includes an extension member 215 to support an end of the seal 130.

Figure 3:
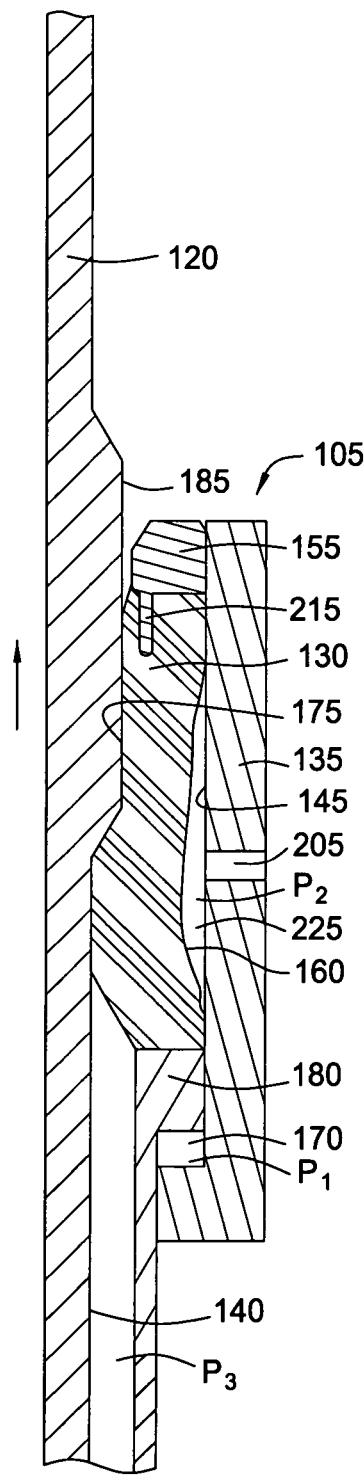
FIG. 3 is a sectional view illustrating the tubular urged through the active seal assembly of the rotating control head.

FIG. 3 is a sectional view illustrating the tubular 120 urged axially through the active seal assembly 105 of the rotating control head 100. As shown, a portion of the larger diameter outer surface 185 has moved through the seal assembly 105, thereby causing the seal 130 to move toward the backing surface 145 of the housing 135 and reconfigure the shape of the cavity 160 by moving the piston 180 away from the end 155. At the same time, the pressure P1 increases as the volume in the chamber 170 decreases due to the movement of the piston 180. Additionally, the pressure P2 in the chamber 225 is monitored and adjusted accordingly by the hydraulic control unit.

Figure 4:
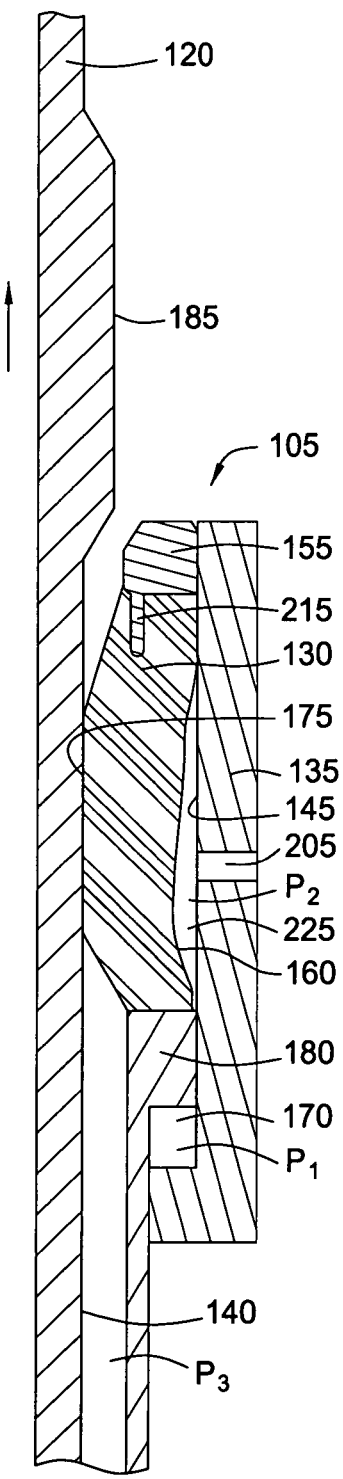
FIG. 4 is a sectional view illustrating the tubular urged further through the active seal assembly of the rotating control head.

FIG. 4 is a sectional view illustrating the tubular 120 urged axially further through the active seal assembly 105 of the rotating control head 100. As shown, the smaller diameter surface 140 of the tubular 120 is again now in contact with the seal 130, thereby allowing the seal member 130 to move away from the backing surface 145 of the housing 135 and reconfigure the shape of the cavity 160 by allowing the piston 180 to move away from the end 155. At the same time, the pressure P1 decreases as the volume in the chamber increases due to the movement of the piston 180. Additionally, the pressure P2 in the chamber 225 is monitored and adjusted due to the movement of the tubular 120.

Figure 5:
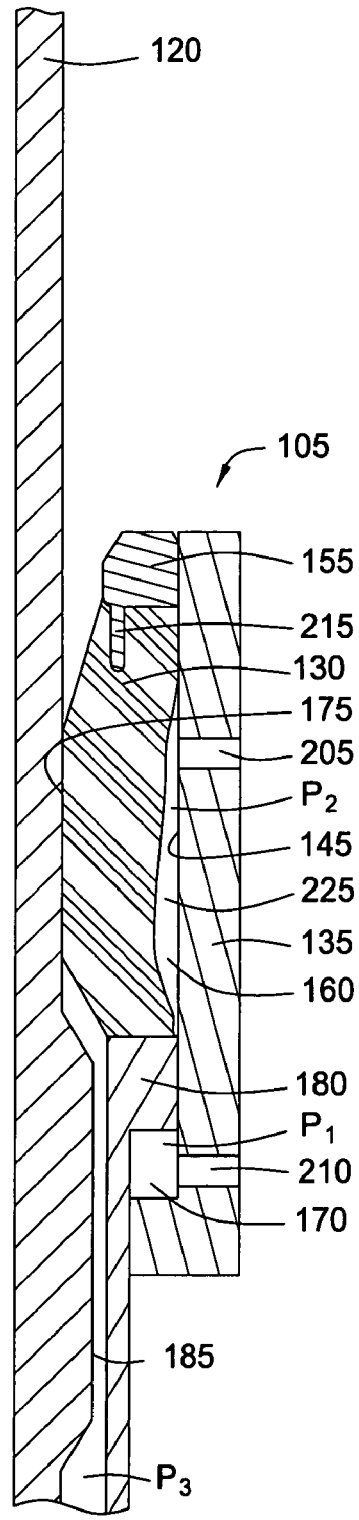
FIG. 5 is an enlarged sectional view of another embodiment of the active seal assembly.

FIG. 5 is an enlarged sectional view of another embodiment of the active seal assembly 105. For convenience, components in FIG. 5 that are similar to components in FIG. 2 will be labeled with the same number indicator. As shown, the seal 130 has been urged radially inward into contact with the tubular 120, thereby forming a sealing relationship between the tubular 120 and the rotating control head 100. In this embodiment, the sealing relationship is formed by urging fluid through the port 205 into the chamber 225 formed between the housing 135 and the seal 130 and by urging fluid through a port 210 into the chamber 170 formed between the housing 135 and the piston 180. As fluid builds up in chamber 225 and chamber 170, the fluid pressure P2 and the fluid pressure P1 urge the seal 130 toward the tubular 120 to form the sealing relationship therebetween. Thereafter, the hydraulic control maintains and monitors the fluid pressure P2 in chamber 225 and the fluid pressure P1 in chamber 170. As the larger diameter outer surface 185 of the tubular 120 is urged through the seal assembly 105, the seal 130 moves toward the backing surface 145 of the support housing 135 and subsequently reconfigures the shape of the cavity 160 by moving the piston 180 in the chamber 170. In this embodiment, the fluid pressure P1 is preferably maintained between 0 to 200 psi above the wellbore pressure P3 and the fluid pressure P2 is preferably maintained around 25% to 75% of P1. In another embodiment, the fluid pressure P2 is preferably maintained between 0 to 200 psi above the wellbore pressure P3 and the fluid pressure P2 is preferably maintained around 25% to 75% of P1. In yet another embodiment, both the fluid pressure P1 and P2 are preferably maintained between 0 to 200 psi above the wellbore pressure P3.

Figure 6:
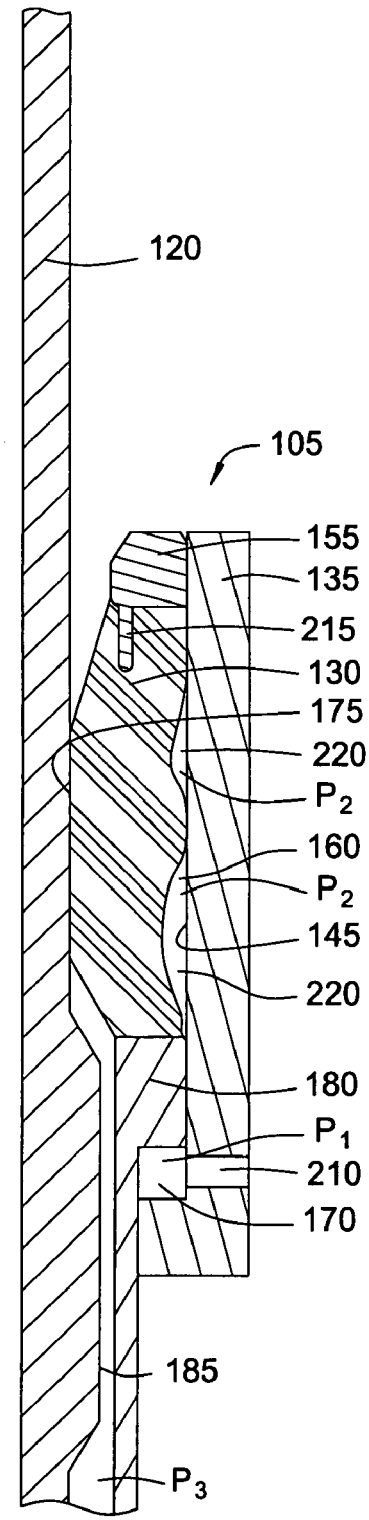
FIG. 6 is an enlarged sectional view of another embodiment of the active seal assembly.

FIG. 6 is an enlarged sectional view of another embodiment of the active seal assembly 105. For convenience, components in FIG. 6 that are similar to components in FIG. 2 will be labeled with the same number indicator. As shown, the seal 130 has been urged radially inward into contact with the tubular 120, thereby forming a sealing relationship between the tubular 120 and the rotating control head 100. In this embodiment, the sealing relationship is formed by urging fluid through the port 210 into the chamber 170 formed between the housing 135 and the piston 180. As fluid builds up in the chamber 170, the fluid pressure P1 urges the piston 180 towards the end 155 thus changing the volume of the cavity 160 and causing the seal 130 to move toward the tubular 120 to form the sealing relationship therebetween. Thereafter, the hydraulic control maintains and monitors the fluid pressure P1 in the chamber 170. As the larger diameter outer surface 185 of the tubular 120 is urged through the seal assembly 105, the seal 130 moves toward the backing surface 145 of the support housing 135 and subsequently reconfigures the shape of the cavity 160 by moving the piston in the chamber 170. In this embodiment, the fluid pressure P1 is preferably maintained between 0 to 200 psi above the wellbore pressure P3 and the pressure P2 is maintained at atmospheric pressure.

Figure 7:
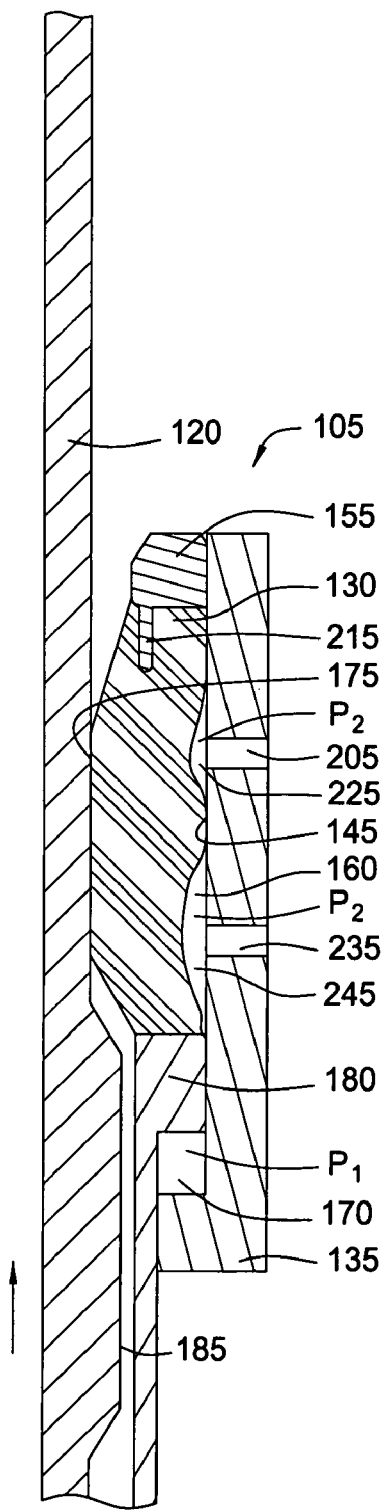
FIG. 7 is an enlarged sectional view of another embodiment of the active seal assembly.

FIG. 7 is an enlarged sectional view of another embodiment of the active seal assembly 105. For convenience, components in FIG. 7 that are similar to components in FIG. 2 will be labeled with the same number indicator. As shown, the seal 130 has been urged radially inward into contact with the tubular 120, thereby forming a sealing relationship between the tubular 120 and the rotating control head 100. In this embodiment, the sealing relationship is formed by urging fluid through the port 205 into the chamber 225 formed between the housing 135 and the seal 130 and by urging fluid through a port 235 into the chamber 245 formed between the housing 135 and the seal 130. As fluid builds up in the chamber 225 and the chamber 245, the fluid pressure P2 urges the seal 130 toward the tubular 120 to form the sealing relationship therebetween. Thereafter, the hydraulic control maintains and monitors the fluid pressure P2 in the chamber 225 and the chamber 245. As the larger diameter outer surface 185 of the tubular 120 is urged through the seal assembly 105, the seal 130 moves toward the backing surface 145 of the support housing 135 and subsequently reconfigures the shape of the cavity 160 by moving the piston in the chamber 170. In this embodiment, the fluid pressure P2 is preferably maintained between 0 to 200 psi above the wellbore pressure P3 and the pressure P1 is maintained at atmospheric pressure.

Figure 8:
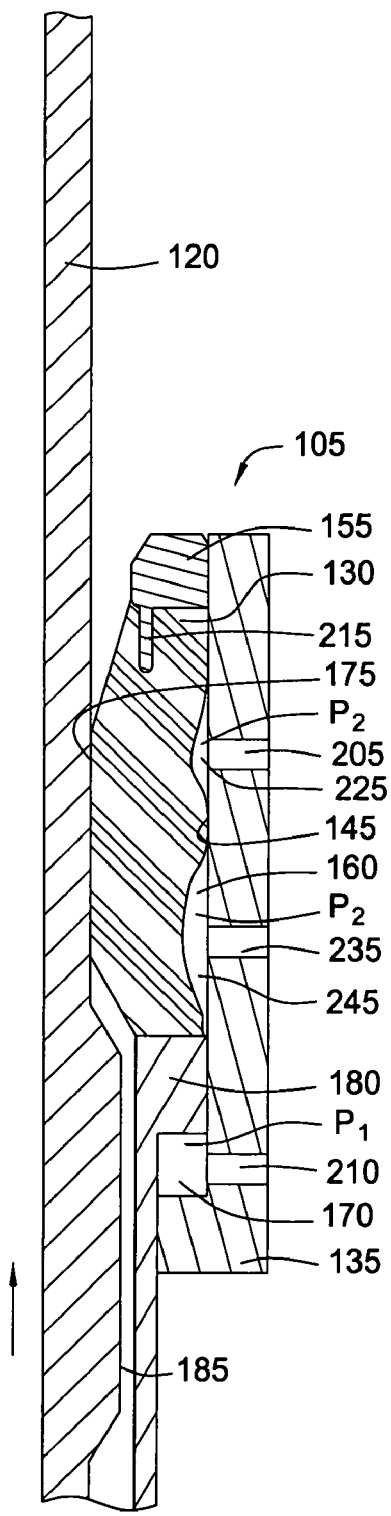
FIG. 8 is an enlarged sectional view of another embodiment of the active seal assembly.
Figure 9:
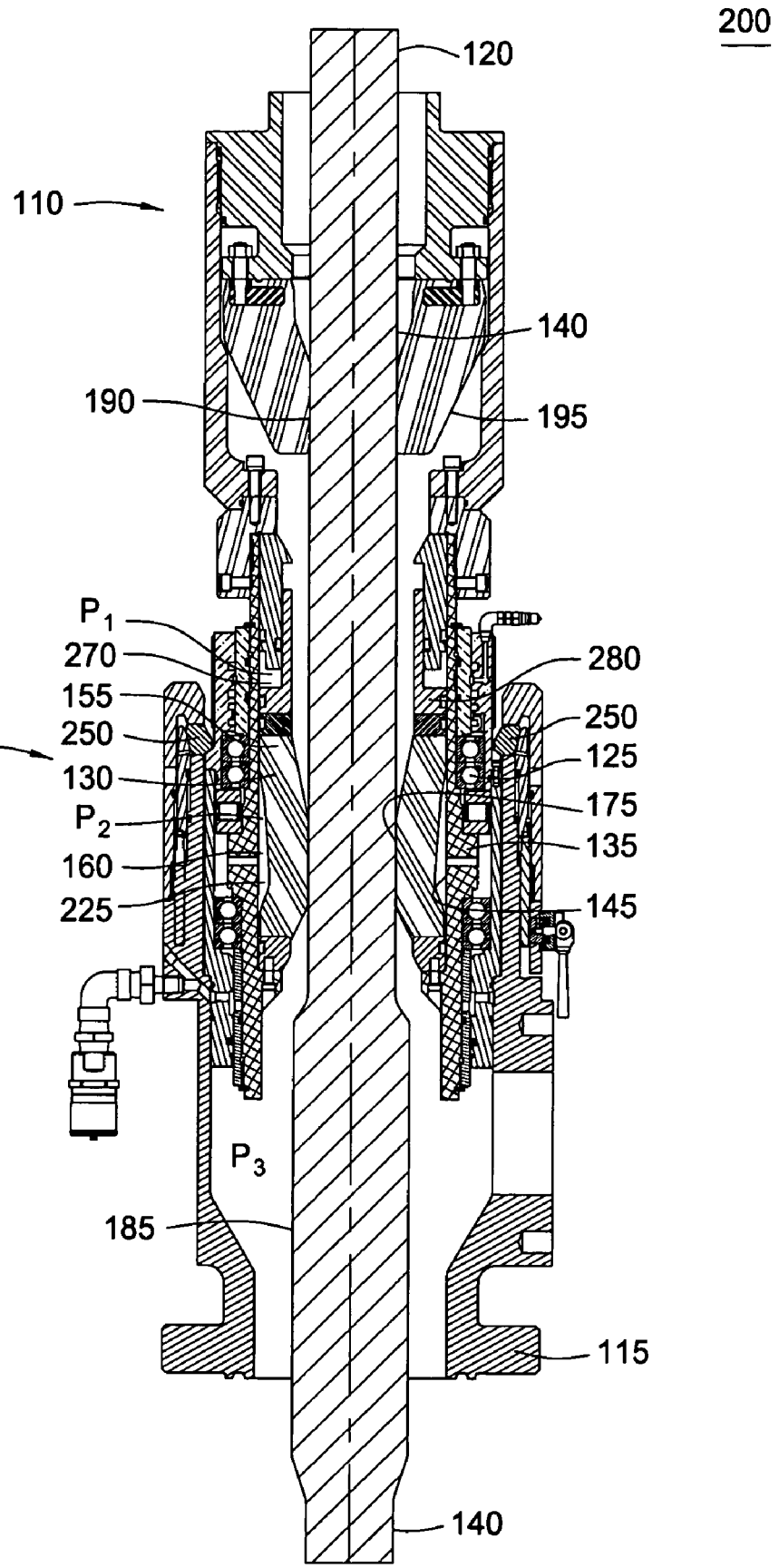
FIG. 9 is a cross-sectional view illustrating another embodiment of a rotating control head in accordance with the present invention.

FIG. 8 is an enlarged sectional view of another embodiment of the active seal assembly 105. For convenience, components in FIG. 8 that are similar to components in FIG. 2 will be labeled with the same number indicator. As shown, the seal 130 has been urged radially inward into contact with the tubular 120, thereby forming a sealing relationship between the tubular 120 and the rotating control head 100. In this embodiment, the sealing relationship is formed by urging fluid through the port 205 into the chamber 225 and through the port 235 into the chamber 245 and through the port 210 into the chamber 170. As fluid builds up in the chambers 225, 245, 170, the fluid pressures P2 and P1 urge the seal 130 toward the tubular 120 to form the sealing relationship therebetween. Thereafter, the hydraulic control maintains and monitors the fluid pressure P2 in the chambers 225 and 245 and the fluid pressure P1 in the chamber 170. As the larger diameter outer surface 185 of the tubular 120 is urged through the seal assembly 105, the seal 130 moves toward the backing surface 145 of the support housing 135 and subsequently reconfigures the shape of the cavity 160 by moving the piston in the chamber 170. In this embodiment, the fluid pressure P1 is preferably maintained between 0 to 200 psi above the wellbore pressure P3 and the fluid pressure P2 is preferably maintained around 25% to 75% of P1.

FIG. 9 is a cross-sectional view illustrating another embodiment of a rotating control head 200 in accordance with the present invention. For convenience, components in FIG. 9 that are similar to components in FIG. 1 will be labeled with the same number indicator. As shown in FIG. 9, the rotating control head 200 includes the passive seal assembly 110 and the active seal assembly 105 in a similar manner as the rotating control head 100 in FIG. 1. The primary difference between the rotating control head 200 and the rotating control head 100 is the location of a movable wall portion in the form of a piston 280 and a corresponding chamber 270. As illustrated, the piston 280 is located at an upper end of the active seal assembly 105. Due to this arrangement, the wellbore pressure P3 does not assist the piston 280 to form the seal between the seal member 130 and the tubular 120 and therefore the pressure P1 in the chamber 270 must be maintained at higher pressure then the pressure P1 in the chamber 170 in the rotating control head 100 of FIG. 1. Other than the location of the piston 280 and the corresponding chamber 270, the active seal assembly 105 in rotating control head 200 in FIG. 9 may be configured and operated in a similar manner as described and shown in FIGS. 2-8.

While the foregoing is directed to embodiments of the present invention, other and further embodiments of the invention may be devised without departing from the basic scope thereof, and the scope thereof is determined by the claims that follow.

The invention claimed is:

1. A seal assembly for use with a control head, comprising:
   a backing member;
   a cavity formed between the backing member and a tubular and having a first surface that is axially movable relative to a second surface; and
   a seal member disposed between the first and second surfaces and sealable with the tubular, wherein a portion of the seal member is affixed to the first surface to prevent relative movement therebetween, and wherein a substantially constant fluid pressure is applied to the first surface while the first surface is moved by deformation of the seal member.

2. The seal assembly of claim 1, wherein the first surface is selectively movable in the relative direction of the second surface to facilitate the deformation of the seal member in order to form a seal with the tubular.

3. The seal assembly of claim 1, wherein the first surface is a piston surface.

4. The seal assembly of claim 3, wherein the piston surface is selectively movable by the fluid pressure acting on a rear surface thereof.

5. The seal assembly of claim 4, wherein the seal member is sealable with the tubular due to pressurized fluid applied to a portion of the seal member, wherein the pressurized fluid applied to the seal member is greater than the pressurized fluid applied to the piston surface.

6. The seal assembly of claim 4, wherein the seal member is sealable with the tubular due to pressurized fluid applied to a portion of the seal member, wherein the pressurized fluid applied to the seal member is less than the pressurized fluid applied to the piston surface.

7. The seal assembly of claim 4, wherein the seal member is sealable with the tubular due to pressurized fluid applied to a portion of the seal member, wherein the pressurized fluid applied to the seal member is substantially equal to the pressurized fluid applied to the piston surface.

8. The seal assembly of claim 3, wherein the piston surface operates in a balanced condition permitting the first surface to move in response to changes in a diameter of the tubular.

9. The seal assembly of claim 1, wherein the first surface is selectively movable due to a change in a diameter of the tubular.

10. The seal assembly of claim 1, wherein an end of the seal member is movable due to a change in a diameter of the tubular.

11. A seal assembly for use with a control head, comprising:
    a seal constrained between a first surface and a second surface, wherein the first surface is axially movable relative to the second surface; and
    a pipe having a pipe surface, wherein the seal is sealingly engageable with the pipe surface by application of a selectively adjustable compressive force applied by the first surface to the seal and a fluid pressure applied to a side portion of the seal between the first surface and the second surface, wherein a portion of the seal is affixed to the first surface to prevent relative movement therebetween.

12. The seal assembly of claim 11, wherein the side portion is substantially opposite a side of the seal that is sealingly engageable with the pipe surface.

13. A method for sealing an annular space defined by a wellbore tubular and a seal housing, comprising:
    providing a seal member within a variable volume cavity, the cavity contained within the seal housing;
    providing the wellbore tubular extending through the seal housing, wherein the wellbore tubular includes a variable diameter outer surface;
    applying a fluid pressure to a side of the seal member, thereby creating a seal between the seal member and the wellbore tubular;
    varying a volume of the cavity by regulating a volume of a variable volume chamber disposed adjacent the cavity in response to the movement of the variable diameter outer surface through the seal member, wherein the volume of the variable volume chamber changes by axially moving a wall portion of the chamber in response to a change in a shape of the seal member; and
    providing a substantially constant fluid pressure to the variable volume chamber while the volume of the cavity is varied.

14. The method of claim 13, further comprising providing a substantially constant fluid pressure to the variable volume cavity while the volume of the cavity is varied.

15. A seal assembly for use with a control head, comprising:
a seal member; and
a first surface and a second surface, the seal member axially compressible therebetween and deformable to form a seal with a third surface, wherein the seal member has a first end affixed to the first surface to prevent relative movement therebetween and a second end disposed adjacent the second surface, wherein the seal is formed with the third surface due to fluid pressure acting at a point on the seal member between the first and second ends, and wherein the first surface is a piston that is selectively and axially movable relative to the second surface in response to a non-uniform profile of the third surface.

16. The seal assembly of claim 15, wherein the piston is movable relative to the second surface by regulating fluid pressure in the piston.

17. The seal assembly of claim 16, wherein the piston and the seal member are mounted on at least one bearing, thereby allowing the piston and the seal member to rotate with the third surface.

18. The seal assembly of claim 17, wherein the piston is movable due to pressurized fluid on a rear surface thereof.

19. The seal assembly of claim 15, wherein the point is proximate a midpoint between the first and second ends.

20. A seal assembly for use with a control head, comprising:
an annular cavity for housing a seal member, the annular cavity formed between a tubular string having a variable diameter and a backing surface; and
a movable wall portion of the annular cavity permitting a shape of the cavity to change in the area of the movable wall portion due to a change in a shape of the seal member, wherein a portion of the seal member is affixed to the movable wall portion to prevent relative movement therebetween, wherein the movable wall portion is moved by the seal member in response to the change in the shape of the seal member due to axial movement of the variable diameter of the tubular string through the seal member, wherein fluid pressure acting on the seal member urges the seal member into sealing contact with the variable diameter of the tubular string, and wherein the seal member is provided with a substantially constant fluid pressure as the movable wall portion is moved and the shape of the cavity changes.

21. The seal assembly of claim 20, wherein the shape of the cavity also changes in response to pressure moving the movable wall portion.

22. The seal assembly of claim 20, wherein the movable wall portion adjusts automatically.

23. The seal assembly of claim 20, wherein the movable wall portion is a compliant annular piston.

24. The seal assembly of claim 20, wherein the seal member, the backing surface and the movable wall portion are mounted on at least one bearing to allow rotation with the tubular string.

25. A method for sealing a tubular string in a control head, comprising:
activating a seal member housed in an annular cavity defined between the tubular string and a backing surface, wherein the seal member is activated by fluid pressure acting on the seal member which has been injected into a chamber formed between the backing surface and the seal member;
urging the tubular string through the control head;
adjusting at least one dimension of the annular cavity by regulating fluid pressure in a variable volume chamber disposed below the annular cavity due to a change in the shape of the seal member; and
maintaining a substantially constant fluid pressure in the variable volume chamber while adjusting the at least one dimension of the annular cavity.

26. The method of claim 25, wherein the tubular string includes a joint member having an outer diameter larger than an outer diameter of the tubular string.

27. The method of claim 25, wherein the change in the shape of the seal member is due to contact with the tubular string.

28. The method of claim 25, wherein the shape of the annular cavity is adjusted by moving a movable wall portion of the annular cavity.

29. The method of claim 25, further comprising providing a substantially constant fluid pressure to the annular cavity while adjusting the at least one dimension of the annular cavity.

30. A method for sealing a tubular in a control head, comprising:
activating a rotating seal assembly, the rotating seal assembly including a rotatable member, a cavity formed between the rotatable member and the tubular, and a seal member disposed in the cavity;
creating a seal between the tubular and a point between the ends of the seal member due to a fluid force acting on the seal member while rotating the seal assembly with the tubular;
redistributing a volume of the cavity in response to a variation in a diameter of the tubular by adjusting a movable piston surface of the cavity by regulating fluid pressure in a piston chamber acting on the movable piston surface, wherein a volume of the piston chamber changes in response to the variation in the diameter of the tubular; and
providing a substantially constant fluid pressure to the piston chamber while adjusting the movable piston surface.

31. The method of claim 30, further comprising providing a substantially constant fluid pressure to the cavity while adjusting the movable piston surface.

32. A method for sealing a tubular in a control head, comprising:
providing a seal member contained within a substantially cylindrical volume;
causing the seal member to deform radially by applying a compressive force at a movable end of the volume to an end of the seal member and a fluid pressure force to a side of the seal member, wherein the end of the seal member is affixed to the moveable end of the volume;
balancing the compressive force with a radial reforming force by selectively adjusting movement of the movable end of the volume with an external fluid pressure acting on the movable end of the volume to allow an object applying the reforming force to pass axially through the seal member; and
providing a substantially constant external fluid pressure to the movable end of the volume while balancing the compressive force.

33. A method of sealing a tubular string in a rotating control head, comprising:
rotating the tubular string, the tubular string having a smaller diameter portion and a larger diameter portion;
rotating a portion of the rotating control head, the portion comprising a seal member disposed in a variable volume cavity, wherein the seal member engages the tubular string due to fluid pressure acting on a surface of the seal member;

moving the larger diameter portion axially through the seal member;

selectively adjusting a volume of the cavity in response to the variation in the diameter of the tubular string by regulating movement of a movable surface of the cavity with an external fluid pressure acting on the movable surface, wherein a portion of the seal member is affixed to the movable surface of the cavity; and providing a substantially constant external fluid pressure to the movable surface while selectively adjusting the volume of the cavity.

34. A seal assembly for use with a control head, comprising:

an annular cavity formed between a tubular string, a backing surface, a movable wall portion and a fixed wall portion; and a seal member disposed in the annular cavity, wherein the seal member is configured to create a seal with the tubular string due to a fluid pressure acting on a side of the seal member and a fluid pressure acting on the moveable wall portion and wherein the movable wall portion is configured to allow a shape of the cavity to change by selectively controlling the fluid pressure in response to a change in the shape of the seal member caused by the movement of the tubular string relative to the seal member, wherein a portion of the seal member is affixed to the moveable wall portion to prevent relative movement between the portion of the seal member and the moveable wall portion.

35. The seal assembly of claim 34, wherein the backing surface, the movable wall portion, the fixed wall portion and the seal member are mounted on at least one bearing to allow rotation with the tubular string.

36. A method of sealing a tubular string in a control head, comprising:

forming a seal between a seal member disposed in a cavity of the control head and the tubular string by applying a first fluid pressure to a side of the seal member, wherein a portion of the cavity is defined by an axially movable wall portion;

urging the tubular string axially through the seal member, the tubular string having a smaller diameter portion and a larger diameter portion; and compensating for the movement of the larger diameter portion of the tubular string relative to the seal member by regulating fluid pressure acting on the movable wall portion adjacent the cavity; and providing a substantially constant fluid pressure to the moveable wall portion while moving the moveable wall portion to compensate for the larger diameter portion of the tubular.

37. The method of claim 36, further comprising rotating the tubular string and the seal member.

38. A method for sealing around a tubular, the tubular having a larger diameter portion and a smaller diameter portion, and the tubular movable within a control head, comprising:

constraining an annular seal member between a fixed internal surface and a movable internal surface of the control head;

applying a first fluid pressure to the annular seal member at a location between the fixed internal surface and the movable internal surface, thereby creating a seal against the tubular;

moving the tubular through the control head and maintaining the seal against the tubular as a transition between the larger diameter portion and the smaller diameter portion passes through the annular seal member; and compensating for the transition between the larger diameter portion and the smaller diameter portion by permitting movement of the movable internal surface of the control head by regulating fluid pressure acting on an external portion of the movable internal surface; and providing a substantially constant fluid pressure to the external portion while permitting movement of the moveable internal surface.

39. A method for sealing a tubular string in a control head, comprising:

moving the tubular string through a housing of the control head, wherein the control head includes a seal member disposed in a cavity of the housing and a chamber having an axially movable surface disposed within the housing and adjacent the cavity;

forming a seal between the tubular string and the seal member; and maintaining a substantially constant fluid pressure in the chamber while adjusting a volume of the chamber in response to a change in a shape of the seal member.

40. The method of claim 39, wherein the axially movable surface is a piston surface forming a portion of the chamber, and further comprising moving the piston surface using the seal member to adjust the volume of the chamber.

41. The method of claim 39, wherein the axially movable surface is a piston surface forming a portion of the chamber, and further comprising moving the piston surface using the fluid pressure to adjust the volume of the chamber.

42. The method of claim 39, further comprising maintaining a substantially constant fluid pressure in the cavity while adjusting a volume of the cavity in response to the change in the shape of the seal member.

* * * * *